United States Patent
Sadhukhan et al.

(10) Patent No.: US 9,569,132 B2
(45) Date of Patent: Feb. 14, 2017

(54) PATH SELECTION TO READ OR WRITE DATA

(71) Applicant: EMC Corporation, Hopkinton, MA (US)

(72) Inventors: Amrita Sadhukhan, West Bengal (IN); Mikhail Borisov, Saint-Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/329,336

(22) Filed: Jul. 11, 2014

(65) Prior Publication Data

US 2015/0178011 A1 Jun. 25, 2015

(51) Int. Cl.
*G06F 12/00* (2006.01)
*G06F 3/06* (2006.01)
*G06F 9/50* (2006.01)

(52) U.S. Cl.
CPC .......... *G06F 3/0635* (2013.01); *G06F 3/0611* (2013.01); *G06F 3/0689* (2013.01); *G06F 9/5011* (2013.01)

(58) Field of Classification Search
CPC G06F 9/5011; G06F 12/0871; G06F 12/0873; G06F 2212/282; G06F 9/4843; G06F 9/5077; G06T 2207/20021; G06T 2207/20012; G06T 5/002; G06T 5/009; G06T 5/40; G06T 5/50; G02F 1/011; G02F 1/025; G02F 1/0316
USPC .............................. 711/170; 709/225; 710/38
See application file for complete search history.

(56) References Cited

U.S. PATENT DOCUMENTS

| | | |
|---|---|---|
| 5,568,491 A | 10/1996 | Beal et al. |
| 5,941,992 A | 8/1999 | Croslin et al. |
| 6,434,637 B1 * | 8/2002 | D'Errico .............. G06F 3/0647 710/15 |
| 6,636,981 B1 | 10/2003 | Barnett et al. |
| 6,704,812 B2 | 3/2004 | Bakke et al. |
| 6,725,295 B2 | 4/2004 | Iwatani |
| 6,725,401 B1 | 4/2004 | Lindhorst-Ko |
| 6,754,853 B1 | 6/2004 | DeKoning et al. |
| 6,804,712 B1 | 10/2004 | Kracht |
| 7,111,084 B2 | 9/2006 | Tan et al. |
| 7,257,744 B2 | 8/2007 | Sabet et al. |
| 7,260,628 B2 | 8/2007 | Yamamoto et al. |
| 7,307,948 B2 | 12/2007 | Infante et al. |
| 7,318,138 B1 | 1/2008 | Usgaonkar et al. |
| 7,340,649 B2 | 3/2008 | Anagmuthu et al. |

(Continued)

OTHER PUBLICATIONS

Office Action dated Jun. 18, 2015 corresponding to U.S. Appl. No. 14/133,705; 19 Pages.

(Continued)

*Primary Examiner* — Mardochee Chery
(74) *Attorney, Agent, or Firm* — Daly, Crowley, Mofford & Durkee, LLP

(57) ABSTRACT

In one aspect, a method includes determining a number of read blocks pending for each path from a host to a logical device, determining a number of write blocks pending for each path from the host to the logical device, determining one or more factors associated with time for each path from the host to the logical device and selecting a path from the host to the logical device to read or write data using the number of read blocks pending, the number of write blocks pending and the one or more factors associated with time.

18 Claims, 5 Drawing Sheets

(56) References Cited

U.S. PATENT DOCUMENTS

| | | | |
|---|---|---|---|
| 7,349,961 B2 | 3/2008 | Yamamoto | |
| 7,370,241 B2 | 5/2008 | Nicholson et al. | |
| 7,376,764 B1 | 5/2008 | Todd | |
| 7,406,039 B2 | 7/2008 | Cherian et al. | |
| 7,409,586 B1 | 8/2008 | Bezbaruah et al. | |
| 7,454,533 B2 | 11/2008 | Miki | |
| 7,475,328 B2 | 1/2009 | Kubota et al. | |
| 7,565,570 B2 | 7/2009 | Dohi | |
| 7,617,320 B2 | 11/2009 | Alon et al. | |
| 7,634,691 B2 | 12/2009 | Komatsu et al. | |
| 7,707,151 B1 | 4/2010 | Blumenau et al. | |
| 7,756,830 B1 | 7/2010 | Chao et al. | |
| 7,783,779 B1 | 8/2010 | Scales et al. | |
| 7,937,481 B1 | 5/2011 | Sandstrom et al. | |
| 7,962,567 B1 | 6/2011 | Sandstrom et al. | |
| 8,204,980 B1 | 6/2012 | Sandstrom et al. | |
| 8,843,789 B2 | 9/2014 | Sandstrom et al. | |
| 9,258,242 B1 | 2/2016 | Mallick et al. | |
| 2002/0080445 A1 | 6/2002 | Falkenstein et al. | |
| 2002/0156888 A1 | 10/2002 | Lee et al. | |
| 2002/0156918 A1 | 10/2002 | Valdevit et al. | |
| 2002/0166005 A1* | 11/2002 | Errico | G06F 3/0647 710/38 |
| 2003/0051195 A1 | 3/2003 | Bosa et al. | |
| 2003/0204786 A1 | 10/2003 | Dinker et al. | |
| 2003/0210416 A1 | 11/2003 | Lewis et al. | |
| 2003/0236074 A1 | 12/2003 | Ishii et al. | |
| 2004/0078632 A1 | 4/2004 | Infante et al. | |
| 2004/0117369 A1 | 6/2004 | Mandal et al. | |
| 2004/0205238 A1 | 10/2004 | Doshi et al. | |
| 2004/0210656 A1 | 10/2004 | Beck et al. | |
| 2004/0260736 A1 | 12/2004 | Kern et al. | |
| 2005/0015685 A1 | 1/2005 | Yamamoto | |
| 2005/0028028 A1 | 2/2005 | Jibbe | |
| 2005/0073998 A1 | 4/2005 | Zhu et al. | |
| 2005/0108450 A1 | 5/2005 | Sahara et al. | |
| 2005/0144511 A1 | 6/2005 | Chih | |
| 2005/0188126 A1 | 8/2005 | Mashima et al. | |
| 2005/0262562 A1 | 11/2005 | Gassoway | |
| 2006/0026346 A1 | 2/2006 | Kadoiri et al. | |
| 2006/0034181 A1 | 2/2006 | Noguchi et al. | |
| 2006/0047712 A1 | 3/2006 | Shitomi et al. | |
| 2006/0143332 A1 | 6/2006 | Yagi et al. | |
| 2006/0165002 A1 | 7/2006 | Hicks et al. | |
| 2006/0209707 A1 | 9/2006 | Nakaya et al. | |
| 2006/0253526 A1 | 11/2006 | Welch et al. | |
| 2007/0038748 A1* | 2/2007 | Masuyama | G06F 3/0613 709/225 |
| 2007/0055797 A1 | 3/2007 | Shimozono | |
| 2007/0093124 A1 | 4/2007 | Varney et al. | |
| 2007/0112974 A1 | 5/2007 | Shirogane et al. | |
| 2007/0153683 A1 | 7/2007 | McAlpine | |
| 2007/0169186 A1 | 7/2007 | Ueoka et al. | |
| 2007/0234113 A1 | 10/2007 | Komatsu et al. | |
| 2008/0049637 A1 | 2/2008 | Morrill et al. | |
| 2008/0228987 A1 | 9/2008 | Yagi et al. | |
| 2009/0125754 A1 | 5/2009 | Chandra et al. | |
| 2009/0210620 A1 | 8/2009 | Jibbe et al. | |
| 2009/0257361 A1 | 10/2009 | Deshpande et al. | |
| 2009/0304380 A1 | 12/2009 | Sadananda et al. | |
| 2011/0314145 A1 | 12/2011 | Raleigh et al. | |
| 2013/0339551 A1* | 12/2013 | Flanagan | G06F 13/4022 710/5 |

OTHER PUBLICATIONS

U.S. Appl. No. 11/475,060, filed Jun. 27, 2006.
U.S. Appl. No. 11/819,611, filed Jun. 28, 2007.
Sanjib Mallick, et al.; "Path Selection Using a Service Level Objective," U.S. Appl. No. 14/133,705, filed Dec. 19, 2013 21 pages.
U.S. Appl. No. 14/133,705.
U.S. Appl. No. 11/819,609, filed Jun. 28, 2007, Sandstrom, et al.
http://enterprise.symantec.com, Data Sheet: Storage Management, Veritas CommandCentral™ Storage by Symantec, Centralized Visibility and Control Across Heterogeneous Storage Environments; 4 Pages.
Sanscreen®, The Enabler for Storage service Management, Jan. 2006; 12 Pages.
RSA Technology Solution Brief: Powerpath® Encryption with RSA: The EMC Solution for Securing Data in Enterprise Storage, 16 Pages.
Office Action dated Aug. 10, 2009 for U.S. Appl. No. 11/819,609, filed Jun. 28, 2007 20 pages.
Response to Office Action filed on Oct. 19, 2009 for U.S. Appl. No. 11/819,609 13 pages.
Office Action dated Feb. 2, 2010 for U.S. Appl. No. 11/819,609, filed Jun. 28, 2007 16 pages.
Response to Office Action filed on Apr. 12, 2010 for U.S. Appl. No. 11/819,609 5 pages.
Office Action dated Jul. 6, 2010 for U.S. Appl. No. 11/819,609 17 pages.
Response to Office Action dated Oct. 6, 2010 for U.S. Appl. No. 11/819,609 12 pages.
Final Office Action dated Dec. 23, 2010 for U.S. Appl. No. 11/819,609 15 pages.
Notice of Allowance dated Oct. 16, 2014 for U.S. Appl. No. 11/819,609 12 pages.
U.S. Appl. No. 11/819,612, filed Jun. 28, 2007.
U.S. Appl. No. 13/476,072, filed May 21, 2012.
U.S. Appl. No. 11/819,609, filed Jun. 28, 2007.
Notice of Allowance dated Dec. 18, 2015 corresponding to U.S. Appl. No. 14/133,705; 8 Pages.
Response to Office Action dated Jun. 18, 2015 corresponding to U.S. Appl. No. 14/133,705; Response Filed on Nov. 18, 2015; 11 Pages.

* cited by examiner

US 9,569,132 B2

PATH SELECTION TO READ OR WRITE DATA

CROSS REFERENCE TO RELATED APPLICATIONS

This application claims priority to Russian Patent Application number 2013156784, filed Dec. 20, 2013, and entitled "PATH SELECTION TO READ OR WRITE DATA," which is incorporated herein by reference in its entirety.

BACKGROUND

A path management product may be used to provide management of multiple paths that run from an application to storage devices. A path management product is typically a host-based solution that is used to manage storage area networks (SANs) and, among other things, can detect load imbalances for disk array controllers in a SAN and can identify alternate paths through which to route data. An example of path management product is EMC® POWER-PATH® by EMC Corporation of Hopkinton, Mass.

SUMMARY

In one aspect, a method includes determining a number of read blocks pending for each path from a host to a logical device, determining a number of write blocks pending for each path from the host to the logical device, determining one or more factors associated with time for each path from the host to the logical device and selecting a path from the host to the logical device to read or write data using the number of read blocks pending, the number of write blocks pending and the one or more factors associated with time.

In another aspect, an apparatus includes electronic hardware circuitry configured to determine a number of read blocks pending for each path from a host to a logical device, determine a number of write blocks pending for each path from the host to the logical device, determine one or more factors associated with time for each path from the host to the logical device and select a path from the host to the logical device to read or write data using the number of read blocks pending, the number of write blocks pending and the one or more factors associated with time.

An article includes a non-transitory computer-readable medium that stores computer-executable instructions. The instructions cause a machine to determine a number of read blocks pending for each path from a host to a logical device, determine a number of write blocks pending for each path from the host to the logical device, determine one or more factors associated with time for each path from the host to the logical device and select a path from the host to the logical device to read or write data using the number of read blocks pending, the number of write blocks pending and the one or more factors associated with time.

One of more of the aspects above may include one or more of the following features. Determining one or more factors associated with time for each path from the host to the logical device may include determining a weighted average time to read a single block for each path from the host to the logical device and determining a weighted average time to write a single block for each path from the host to the logical device. A feature that include determining an expected wait time for each path from the host to the logical device using the weighted average time to read a single block and the weighted average time to write a single block and selecting the path from the host to the logical device includes selecting a path with the least expected wait time. Determining the weighted average time to read a single block for each path includes determining a weighted average time to read a single block for last N blocks read and determining a weighted average time to write a single block for each path includes determining a weighted average time to write a single block for each path for last N blocks written, where N is an integer greater than 1. Determining one or more factors associated with time for each path from the host to the logical device includes determining a total path weight using a blocks per time interval value, and wherein selecting the path from the host to the logical device includes selecting a path with the least total path weight. Determining a total path weight includes determining a product of a sum of the number of I/Os pending, the number of read blocks pending and the number of write blocks pending and a path weight of a path.

DETAILED DESCRIPTION

Described herein are techniques to select a path to read or write data. In some examples the techniques include using a number of read blocks pending and a number of write blocks pending to select a path. In other examples, a weighted average time taken for reading a single block and a weighted average time taken for writing may also be used to select a path. In further examples, a path weight based on a blocks per time interval rate may also be used to select a path.

The following definitions may be useful in understanding the specification and claims.

HOST—at least one computer or networks of computers that runs at least one data processing application that issues I/O requests to one or more storage systems; a host is an initiator with a SAN;

I/O REQUEST—an input/output request (sometimes referred to as an I/O), which may be a read I/O request (sometimes referred to as a read request or a read) or a write I/O request (sometimes referred to as a write request or a write);

READ BLOCKS—blocks to be read from; and

WRITE BLOCKS—blocks to be written to.

Figure 1:
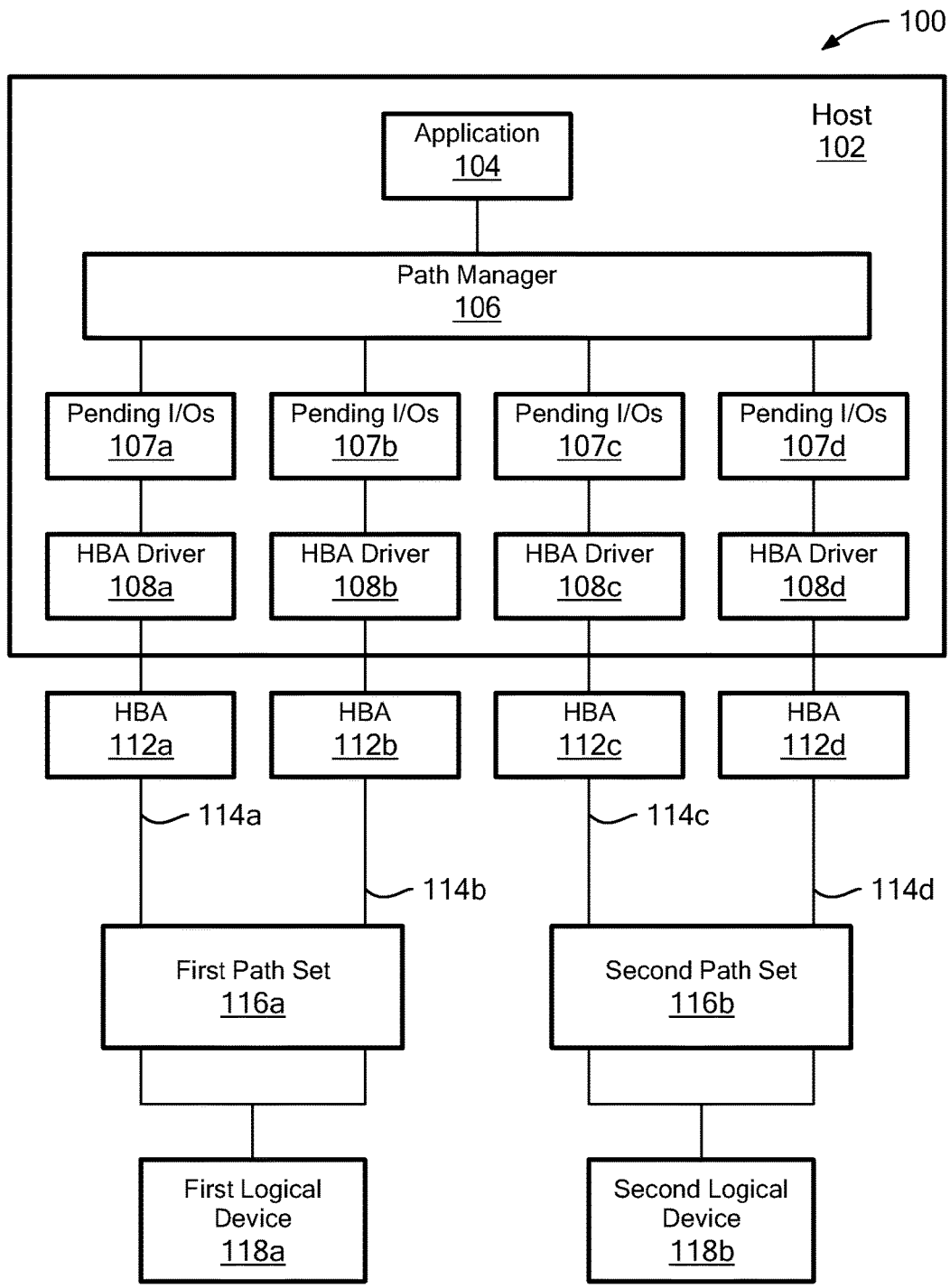
FIG. 1 is a block diagram of an example of a system used to select a path to read or write data.

Referring to FIG. 1, an example of a system to select a path to read or write data is a system 100. The system 10 includes a host 102 coupled to a first logical device 118a by a first path set 116a and coupled to a second logical device 118b by a second path set 116b. The first path set 116a includes multiple paths (e.g., a path 114a and a path 114b). The second path set 116b includes multiple paths (e.g., a path 114c and a path 114d).

The host 102 includes an application 104, a path manager 106, host base adapter (HBA) drivers (e.g., a HBA driver 108a, a HBA driver 108b, a HBA driver 108c and a HBA driver 108d), and HBAs (e.g., a HBA 112a, a HBA 112b, a HBA 112c and a HBA driver 112d).

The path manager 106 determines which path to send an I/O from the application 104. For example, if an application is performing a read operation (i.e., sending a read I/O) on blocks in the first logical device 118a, path selector will determine which paths of the first path set 116a to use (i.e., choosing path 114a or choosing the path 114b). If the path 114a is chosen, the I/O read in this example is sent to the HBA driver 108a. From the HBA driver 108 the I/O read goes to the HBA 112a and then to the path 114a and finally to the first logical device 118a.

Figure 2:
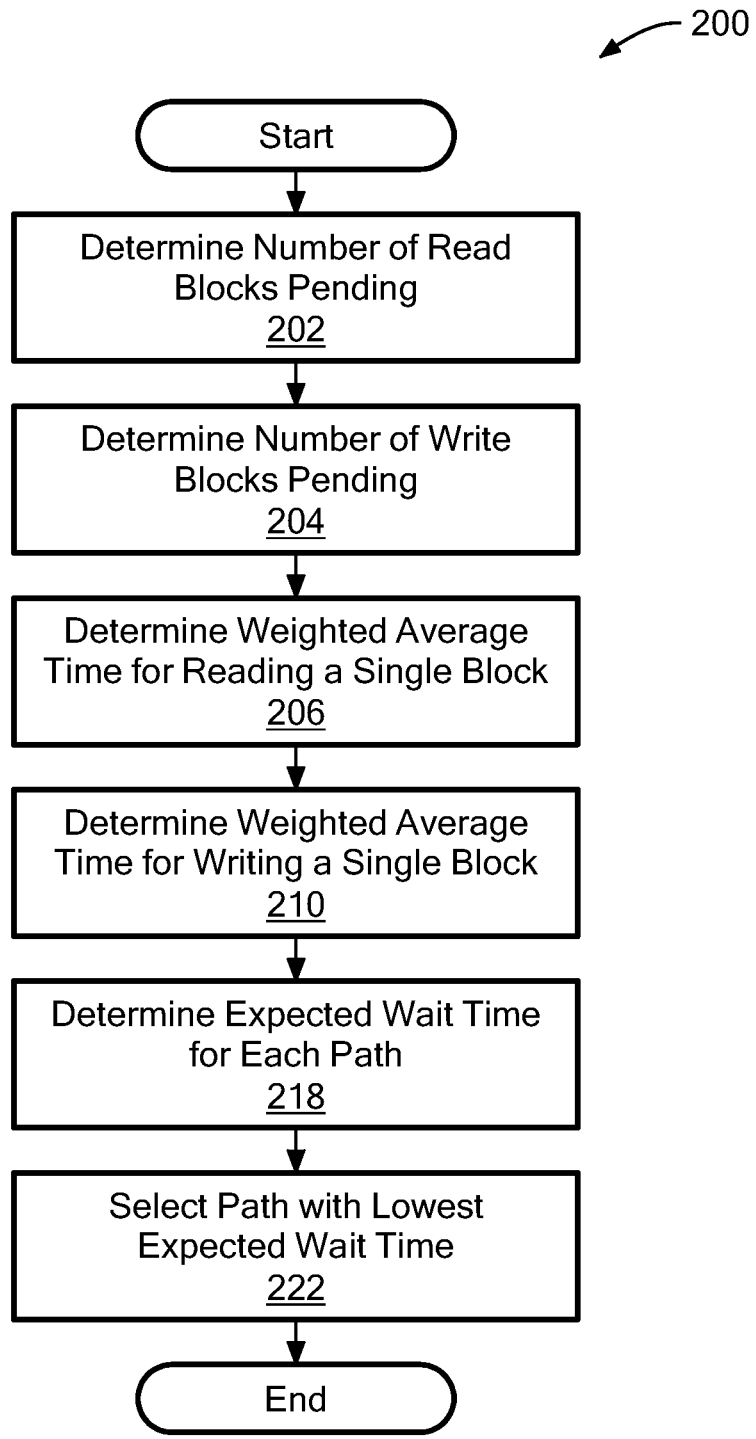
FIG. 2 is a flowchart of an example of a process to select a path to read or write data.

Referring to FIG. 2, an example of a process to select a path to read or write data is a process 200. For example, a new I/O is received from the application 104 for a first logical device 118a. Process 200 determines which of the paths 114a, 114b of the first path set 116a to select.

Process 200 determines a number of read blocks pending (202) and a number of write blocks pending (204) for each path.

Process 200 determines, for each path, a weighted average time for reading a single block (206) and determines, for each path, a weighted average time for reading a single block (210). In some examples, the weighted average time for reading a single block uses the last N blocks read and the weighted average time for writing a single block uses the last N block written, where N is an integer greater than zero.

In some particular examples, the weighted average time for reading a single block using the last N blocks read and the weighted average time for writing a single block using the last N block written may each be determined as a weighted average where more weight is given to the more recent blocks read or written respectively. For example, the weighted average time for reading a single block using the last N blocks read may be equal to:

$$(wt1*R1+wt2*R2+ \ldots +wtN*RN)/(wt1+wt2+ \ldots +wtN)$$

where R1, R2, ..., RN are the actual reading time of the last N blocks in chronological order where R1 is the most recent one read and RN is the oldest one read, and wt1, wt2, ..., wtN are real numbers where wt1>wt2>...>wtN.

In another example, the weighted average time for writing a single block using the last N blocks written may be equal to:

$$(wt1*W1+wt2*W2+ \ldots +wtN*WN)/(wt1+wt2+ \ldots +wtN)$$

where W1, W2, ..., WN are the actual writing time of the last N blocks in chronological order where W1 is the most recent one written and WN is the oldest one written, and wt1, wt2, ..., wtN are real numbers where wt1>wt2>...>wtN.

Process 200 determines an expected wait time for each path (218). For example, the expected wait time, EWT is equal to:

$$EWT=ART*RN+AWT*WN,$$

ART is the weighted average time for reading a single block using the last N blocks read, AWT is the weighted average time for writing a single block using the last N blocks written, RN is equal to a number of pending read blocks and WN is equal to a number of pending write blocks.

Process 200 selects the path with the lowest expected wait time (222).

Figure 3A:
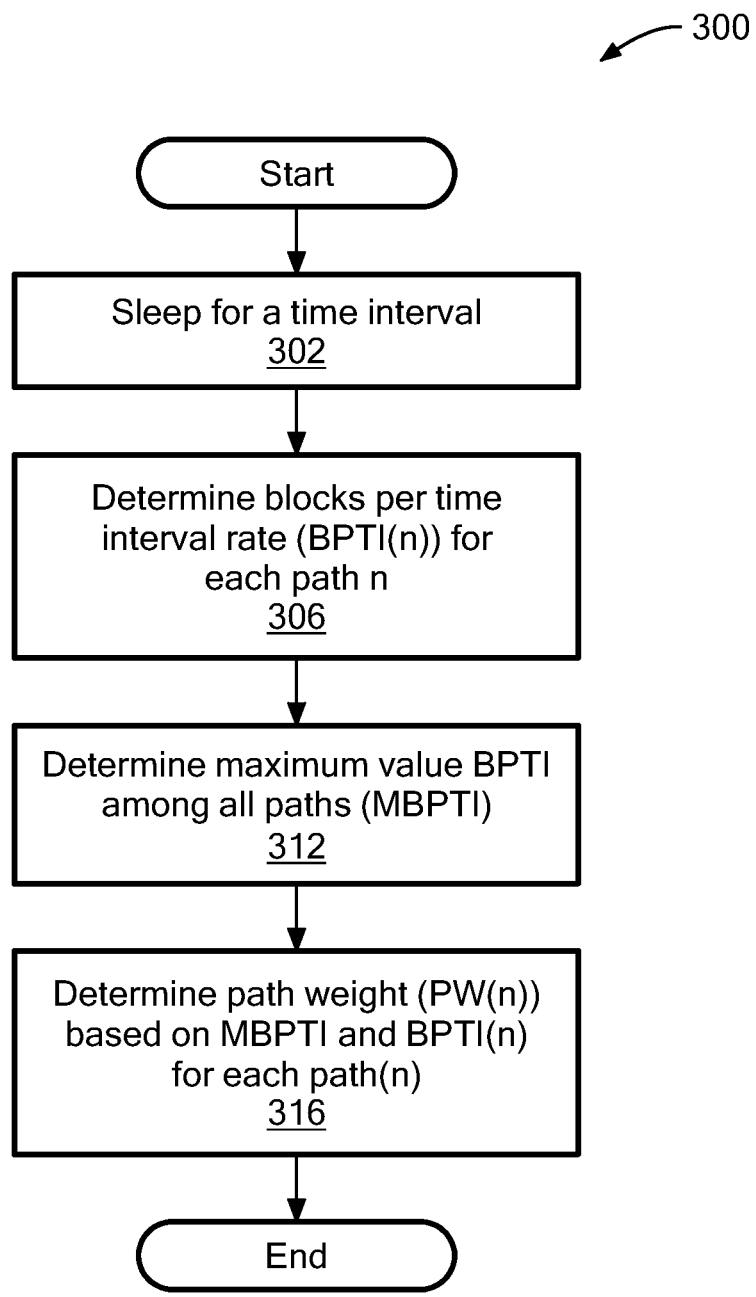
FIGS. 3A and 3B are flowchart of another example of a process to select a path to read or write data.
Figure 3B:
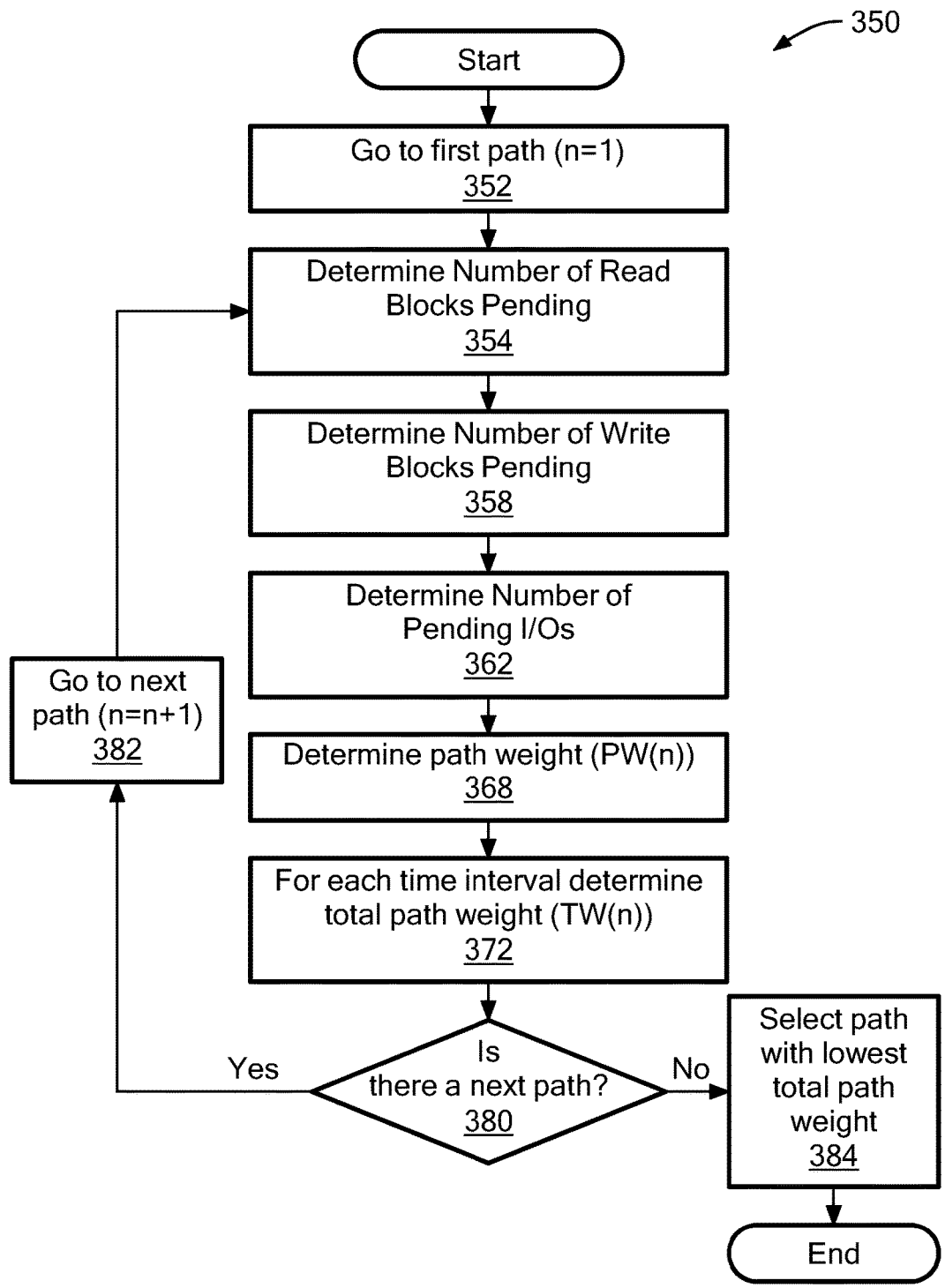

Referring to FIGS. 3A and 3B, another example of a process to select a path to read or write data are processes 300 and 350. Process 300 determines variables used by process 350 to select the path to read or write data. Processes 300 and 350 determines indirect latency (response time) estimation with small computation overhead based on blocks per time interval rate and queue length values.

Process 300 sleeps for a time interval (302). Process determines blocks per time interval rate (BPTI(n)) for each path n (306) and determines the maximum value BPTI rate among all paths (MBPTI) (312). In one example, the time interval is a configurable value that may be chosen by a user.

Process 300 determines path weight (PW(n)) based on MBPTI and BPTI(n) for each path (n) (316). For example, a maximum blocks per time interval value, MBPTI, is determined for all paths. A path weight is determined for each path where a path weight for a path n, PW(n), is equal to:

$$MBTI/BPTI(n),$$

where is BPTI(n) is the blocks per time interval value for a path n, where n is an integer greater than 1.

Process 350 goes to the first path (n=1) (352). Process 350 determines a number of read blocks pending (354), determines a number of write blocks pending (358) and determines a number of pending I/Os (362).

Process 350 determines a path weight for the path (368). For example, the path weight determined in processing block 316 for this path is used.

Process 350 determines the total path weight for the path (372). For example, the total weight for a path n, TW(n) is equal to:

$$PW(n)*(NIO+RN+RW),$$

where NIO is equal to the number of I/Os pending, RN is equal to a number of pending read blocks and WN is equal to a number of pending write blocks.

Process 350 determines if there is another path left to evaluate (380) and if there is process 350 goes to the next path (n=n+1) (382).

If there are no more paths to evaluate, process 350 selects the path with the lowest total path weight (384).

Figure 4:
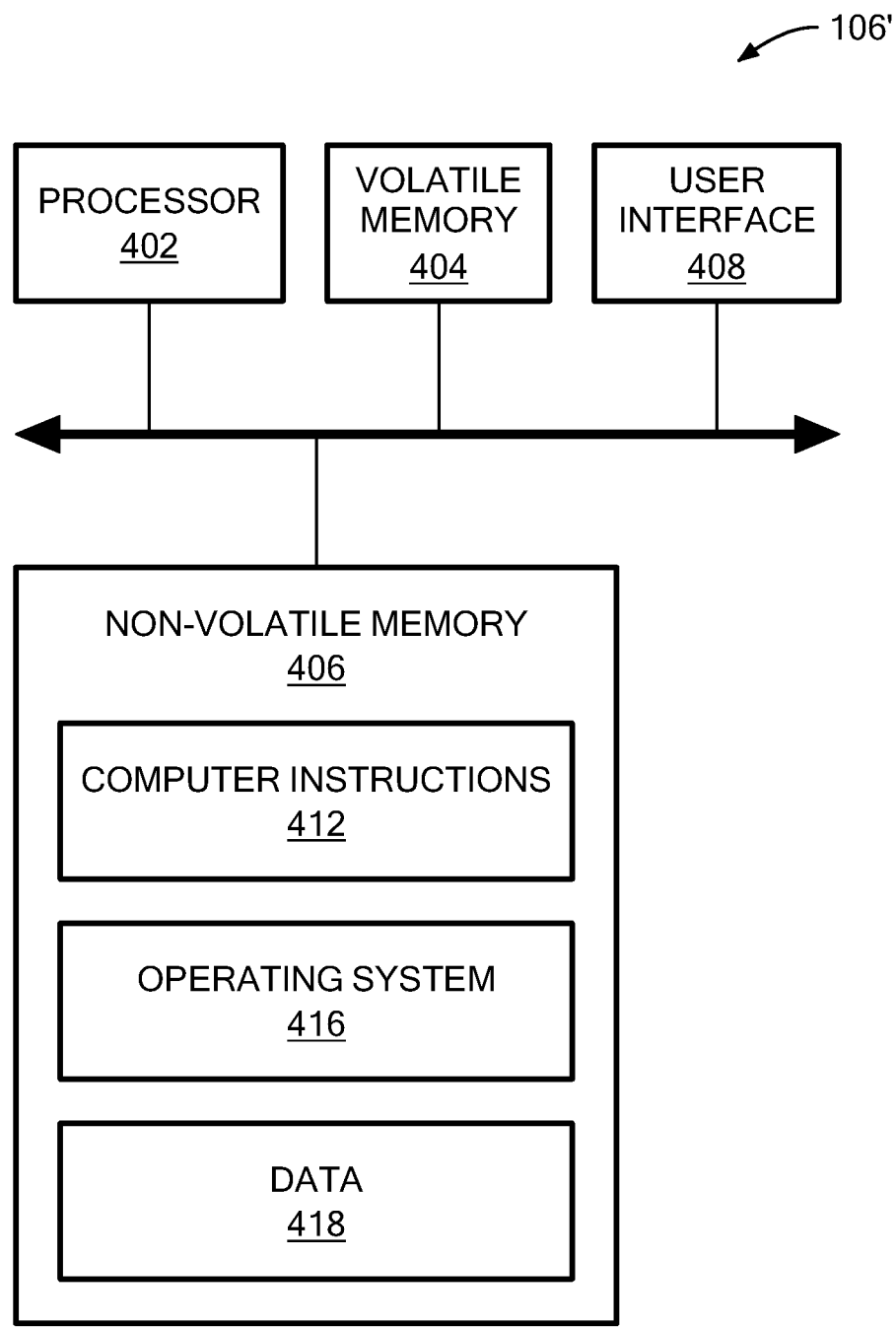
FIG. 4 is a computer on which any of the processes of FIGS. 2, 3A and 3B may be implemented.

Referring to FIG. 4, an example of a path manager 106 is a path manager 106'. The path manager 106' includes a processor 402, a volatile memory 404, a non-volatile memory 406 (e.g., hard disk) and the user interface (UI) 408 (e.g., a graphical user interface, a mouse, a keyboard, a display, touch screen and so forth). The non-volatile memory 406 stores computer instructions 412, an operating system 416 and data 418. In one example, the computer instructions 412 are executed by the processor 402 out of volatile memory 404 to perform all or part of the processes described herein (e.g., processes 200, 300 and 350).

The processes described herein (e.g., processes 200, 300 and 350) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300 and 350 are not limited to the specific processing order of FIGS. 2, 3A and 3B, respectively. Rather, any of the processing blocks of FIGS. 2, 3A and 3B may be re-ordered, combined or removed, performed in parallel or in serial, as necessary, to achieve the results set forth above.

The processing blocks (for example, in the processes 200 and 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
   determining a number of read blocks pending for each path from a host to a logical device;
   determining a number of write blocks pending for each path from the host to the logical device;
   determining one or more factors associated with time for each path from the host to the logical device, wherein determining one or more factors associated with time for each path comprises determining a weighted average time to read a single block for each path from the host to the logical device or a weighted average time to write a single block for each path from the host to the logical device, wherein determining a weighted average time to read a single block for each path comprises:
   assigning weights to each of the N blocks read for the path including assigning larger weight to more recently read blocks,
   generating weighted read times for each of the last N blocks read for the path by multiplying an actual reading time by the corresponding weight; and
   calculating an average of the weighted read times; and
   selecting a path from the host to the logical device to read or write data using the number of read blocks pending, the number of write blocks pending and the one or more factors associated with time.

2. The method of claim 1 wherein determining one or more factors associated with time for each path from the host to the logical device comprises:
   determining a weighted average time to read a single block for each path from the host to the logical device; and
   determining a weighted average time to write a single block for each path from the host to the logical device.

3. The method of claim 2 further comprising determining an expected wait time for each path from the host to the logical device using the weighted average time to read a single block and the weighted average time to write a single block;
   wherein selecting the path from the host to the logical device comprises selecting a path with the least expected wait time.

4. The method of claim 2 wherein determining the weighted average time to read a single block for each path comprises determining a weighted average time to read a single block for last N blocks read, and
   wherein determining a weighted average time to write a single block for each path comprises determining a weighted average time to write a single block for each path for last N blocks written, where N is an integer greater than 1.

5. The method of claim 2 wherein determining a total path weight comprises determining a product of a sum of the number of I/Os pending, the number of read blocks pending and the number of write blocks pending and a path weight of a path.

6. The method of claim 2 wherein:
   determining a weighted average time to read a single block for each path comprises:
   assigning read weights to each of the last N blocks read for the path;
   generating weighted read times for each of the last N blocks read for the path by multiplying an actual read time by the corresponding read weight; and
   calculating an average of the weighted read times; and
   determining a weighted average time to write a single block for each path comprises:
   assigning write weights to each of the last N blocks write for the path;
   generating weighted write times for each of the last N blocks write for the path by multiplying an actual write time by the corresponding write weight; and
   calculating an average of the weighted write times.

7. An apparatus, comprising:
   electronic hardware circuitry configured to:
   determine a number of read blocks pending for each path from a host to a logical device;
   determine a number of write blocks pending for each path from the host to the logical device;
   determine one or more factors associated with time for each path from the host to the logical device, wherein the one or more factors associated with time for each path comprise a weighted average time to read a single block for each path from the host to the logical device or a weighted average time to write a single block for each path from the host to the logical device, wherein determining a weighted average time to read a single block for each path comprises:
assigning weights to each of the last N blocks read for the path including assigning larger weights to more recently read blocks:
generating weight read times for each of the last N blocks read for the path by multiplying an actual reading time by the corresponding weight; and
calculating an average of the weighted read times; and
select a path from the host to the logical device to read or write data using the number of read blocks pending, the number of write blocks pending the one or more factors associated with time.

8. The apparatus of claim 7, wherein the circuitry comprises at least one of a processor, a memory, a programmable logic device or a logic gate.

9. The apparatus of claim 7 wherein the circuitry configured to determine one or more factors associated with time for each path from the host to the logical device comprises circuitry configured to:
determine a weighted average time to read a single block for each path from the host to the logical device; and
determine a weighted average time to write a single block for each path from the host to the logical device.

10. The apparatus of claim 9, further comprising circuitry configured to determine an expected wait time for each path from the host to the logical device using the weighted average time to read a single block and the weighted average time to write a single block,
wherein circuitry configured to select the path from the host to the logical device comprises circuitry configured to select a path with the least expected wait time.

11. The apparatus of claim 9
wherein the circuitry configured to determine the weighted average time to read a single block for each path comprises circuitry configured to determine a weighted average time to read a single block for last N blocks read, and
wherein the circuitry configured to determine a weighted average time to write a single block for each path comprises circuitry configured to determine a weighted average time to write a single block for each path for last N blocks written, where N is an integer greater than 1.

12. The apparatus of claim 7 wherein the circuitry configured to determine one or more factors associated with time for each path from the host to the logical device comprises circuitry configured to determine a total path weight using a blocks per time interval value, and
wherein the circuitry configured to select the path from the host to the logical device comprises circuitry configured to select a path with the least total path weight.

13. The apparatus of claim 12 wherein the circuitry configured to determine a total path weight comprises circuitry configured to determine a product of a sum of the number of Ms pending, the number of read blocks pending and the number of write blocks pending and a path weight of a path.

14. An article comprising:
a non-transitory computer-readable medium that stores computer-executable instructions, the instructions causing a machine to:
determine a number of read blocks pending for each path from a host to a logical device;
determine a number of write blocks pending for each path from the host to the logical device;
determine one or more factors associated with time for each path from the host to the logical device, wherein the one or more factors associated with time for each path comprise a weighted average time to read a single block for each path from the host to the logical device or a weighted average time to write a single block for each path from the host to the logical device, wherein determining a weighted average time to read a single book for each path comprises:
assigning weights to each of the last N blocks read for the path including assigning larger weights to more recently read blocks;
generating weighted read times for each of the last N blocks read for the path by multiplying an actual reading time by the corresponding weight; and
calculating an average of the weighted read times; and
select a path from the host to the logical device to read or write data using the number of read blocks pending, the number of write blocks pending the one or more factors associated with time.

15. The article of claim 14 wherein the instructions causing the machine to determine one or more factors associated with time for each path from the host to the logical device comprises instructions causing the machine to:
determine a weighted average time to read a single block for each path from the host to the logical device; and
determine a weighted average time to write a single block for each path from the host to the logical device.

16. The article of claim 15, further comprising instructions causing the machine to determine an expected wait time for each path from the host to the logical device using the weighted average time to read a single block and the weighted average time to write a single block,
wherein instructions causing the machine to select the path from the host to the logical device comprises instructions causing the machine to select a path with the least expected wait time.

17. The article of claim 15 wherein the instructions causing the machine to determine the weighted average time to read a single block for each path comprises instructions causing the machine to determine a weighted average time to read a single block for last N blocks read, and
wherein the instructions causing the machine to determine a weighted average time to write a single block for each path comprises instructions causing the machine to determine a weighted average time to write a single block for each path for last N blocks written, where N is an integer greater than 1.

18. The article of claim 17 wherein the instructions causing the machine to determine a total path weight comprises instructions causing the machine to determine a product of a sum of the number of I/Os pending, the number of read blocks pending and the number of write blocks pending and a path weight of a path.

* * * * *